United States Patent [19]

Taenzer

[11] Patent Number: 4,625,158
[45] Date of Patent: Nov. 25, 1986

[54] MOTOR CONTROL CIRCUIT FOR VARIABLE RELUCTANCE MOTOR

[75] Inventor: Jon C. Taenzer, Palo Alto, Calif.

[73] Assignee: Adept Technology, Inc., Sunnyvale, Calif.

[21] Appl. No.: 695,170

[22] Filed: Jan. 25, 1985

[51] Int. Cl.⁴ .............................................. H02P 5/40
[52] U.S. Cl. .................................... 318/701; 318/811; 318/685
[58] Field of Search ................ 318/811, 696, 685, 701

[56] References Cited

U.S. PATENT DOCUMENTS

| | | | |
|---|---|---|---|
| 4,250,435 | 2/1981 | Alley et al. | 318/696 |
| 4,316,132 | 2/1982 | Geppert | 318/723 |
| 4,419,615 | 12/1983 | Muto et al. | 318/811 |

Primary Examiner—David Smith, Jr.
Attorney, Agent, or Firm—Flehr, Hohbach, Test, Albritton & Herbert

[57] ABSTRACT

An amplifier circuit for controlling a direct drive motor has an input circuit for converting the digital control word to a pulse width modulated signal which is coupled to a control input of the amplifier through an isolation device. This isolation device and the other gain devices as well as many of the test circuitry devices and the feedback circuitry are referenced to a common, internally generated, stable reference level voltage. An input position control signal is coupled to an operational amplifier whose other inputs is a signal representing the current through the coil at any time. The output of the operational amplifier is a signals which will seek to equalize the two inputs signals. The output of the operational amplifier is coupled to the two controlling transistors which provide the drive current to the motor coil. Diodes are appropriately coupled to the switching transistor to incorporate regeneration effects for the minimization of power consumption. A monitor is also provided to track current flow out of the high voltage source to detect any shorts in the output system or load. Two transistor switches are provided between the initial high-voltage source and the coils. A simplified logic circuitry is provided which responds to the detection of failure mode operating conditions and terminates the operation of these switches to cut off high voltage to the coils.

23 Claims, 6 Drawing Figures

FIG.—1

(SERVO AMPLIFIER A)

MOTOR CONTROL CIRCUIT FOR VARIABLE RELUCTANCE MOTOR

This invention is directed generally to the field of motor control circuits and more particularly to a control system for a variable reluctance motor.

This invention is particularly intended to be used with a motor which comprises three coils wound on a magnetic substructure forming a motor of a type generally described in a patent issued to Motornetics Corporation entitled, "Toothed Reluctance Synchro/Resolver" issued as U.S. Pat. No. 4,458,168 on July 3, 1984, and incorporated herein by reference. A separate amplifier is provided for each coil; the leads which are on either end of each coil are energized in sequence by putting defined amounts of current through the coils. The amount of current to be run through the coils is based on the present and desired location of the rotor.

The design of such control system and amplifier must take into account a number of difficulties which have thwarted previous design attempts at successful, highly accurate positioning control of such a motor. Particularly, the inductance of the motor is variable as a function of rotor position and current flow, i.e., changing with time and current. Therefore, the amplifier must be designed to run stably while driving a changing load.

It is an objective of the present invention to provide a motor control circuit for driving and controllably positioning a variable reluctance motor.

More particularly, it is an objective of the present invention to provide a motor amplifier which is capable of running stably while driving a changing load such as occurs in a variable reluctance motor.

Another objective of the present invention is to provide a motor which incorporates a positioning scheme which is compatible with a digital microprocessor controller. Another objective of this invention is to provide a high degree of positioning accuracy for the motor, to make it useful with a high precision, relatively high operating speed robot.

A further known difficulty in the design of such an amplifier is that a number of conflicting priorities must be balanced. The output transistors consume considerable amounts of power when they are in their active region; thus it is desired to provide motor current control using a switching technique called Pulse Width Modulation (pwm). Since the output transistors are in the active region during switching, the switching frequency should not be too high, although kept above the audio range. The amplifier operates efficiently unless the current is at its maximum. The transistors provided operate most efficiently if they switch very rapidly. Therefore, it is an objective of the present invention to provide an amplifier circuit which utilizes MOS transistors to maximize the speed and efficiency of the control circuit.

It is another objective of the present invention to provide a regenerative circuit as a part of the amplifier in order to minimize the power drain necessary to drive the robot and thereby minimize the heat dissipation and thus the expense of heat dissipating components and large power supplies.

The robot of the type which this amplifier is intended to drive is intended for assembly line utilization. Therefore, it is important to minimize the service time required by the amplifiers utilized in this robot. Therefore, it is an objective of the present invention to provide an amplifier which is very robust and relatively simple to diagnose for whatever defect may occur and to service.

In an amplifier of this type, should a short-circuit occur in the output of the amplifier, in a relatively brief period major components of the amplifier circuit could be destroyed because of the high voltages and currents used. Therefore, it is an objective of the present invention to provide appropriate circuitry for terminating the high voltage supply to the amplifier in the event of a short-circuit condition.

A number of other external stress modes can occur to an amplifier of this complexity. For example: open circuits, excessive output loads and power supply "brown-out." Because of the high power which is controlled, it is an objective of this invention to monitor the likely failure modes, and terminate high-voltage supply to the amplifier until any problems can be diagnosed and repaired.

It is a further objective of this invention to provide an amplifier wherein internal failures are also detected, and termination of the high-voltage supply occurs with sufficient rapidity to prevent the cascade failure of components other than the originally failed component.

In any amplifier of such design, it is important to maximize the ability to consistently assemble amplifiers despite some variations which inherently occur in the tolerance of parts used on different amplifier boards. It is an objective of the present invention to design the implementing circuitry in a manner which maximizes the ability to incorporate parts of varying tolerances and allow for the replacement of parts during service calls, while consistently providing an accurate, stabilized amplifier output.

These and other objectives of the present invention are achieved in an amplifier circuit which includes an input circuit for converting the digital control word to a pulse width modulated signal which is coupled to a control input of the amplifier through an isolation device. This isolation device and the other gain devices as well as many of the test circuitry devices and the feedback circuitry are referenced to a common, internally generated, stable reference level voltage in order to simplify the power supply and allow direct powering from the mains power source while maintaining a safety level sufficient to protect the robot operator and all low level microprocess circuitry. The input signal is coupled to an operational amplifier whose other input is a signal representing the current through the coil at any time. The output of the operational amplifier is a signal which will seek to equalize the two input signals. A unique switching scheme is provided to couple the output of the operational amplifier to the two controlling transistors which provide the drive current to the motor coil. Diodes are appropriately coupled to the switching transistor to incorporate regeneration effects for the minimization of power consumption. Means are also provided to monitor current flow out of the high voltage source to detect any shorts in the output system or load.

Two transistor switches are provided between the initial high-voltage source and the coils. A simplified logic circuitry is provided which responds to the detection of failure mode operating conditions and terminates the operation of these switches to cut off high voltage to the coils.

Means are also provided for detecting an open circuit load condition on the amplifier by continuous monitoring of the analog output control signal from the operational amplifier. Since an open circuit load condition will not cause failure of any components, detection of such an open circuit condition is immediately indicated, but does not cut off the high voltage to the system.

Means are also provided for detecting other failure mode conditions such as a fuse blown, over-heated amplifier, low AC supply, low high-voltage or low low-voltage DC supply, or amplifier circuitry failure. In the event of all of these conditions, the high voltage input to the system is terminated to prevent cascading of the effects of these failure mode conditions.

Other significant features and advantages of the present invention will become more apparent to a person of skill in the art who studies the disclosure of the present invention which is given with reference to the following figures. However, the scope of the present invention is to be limited only by the following claims.

Figure 1:
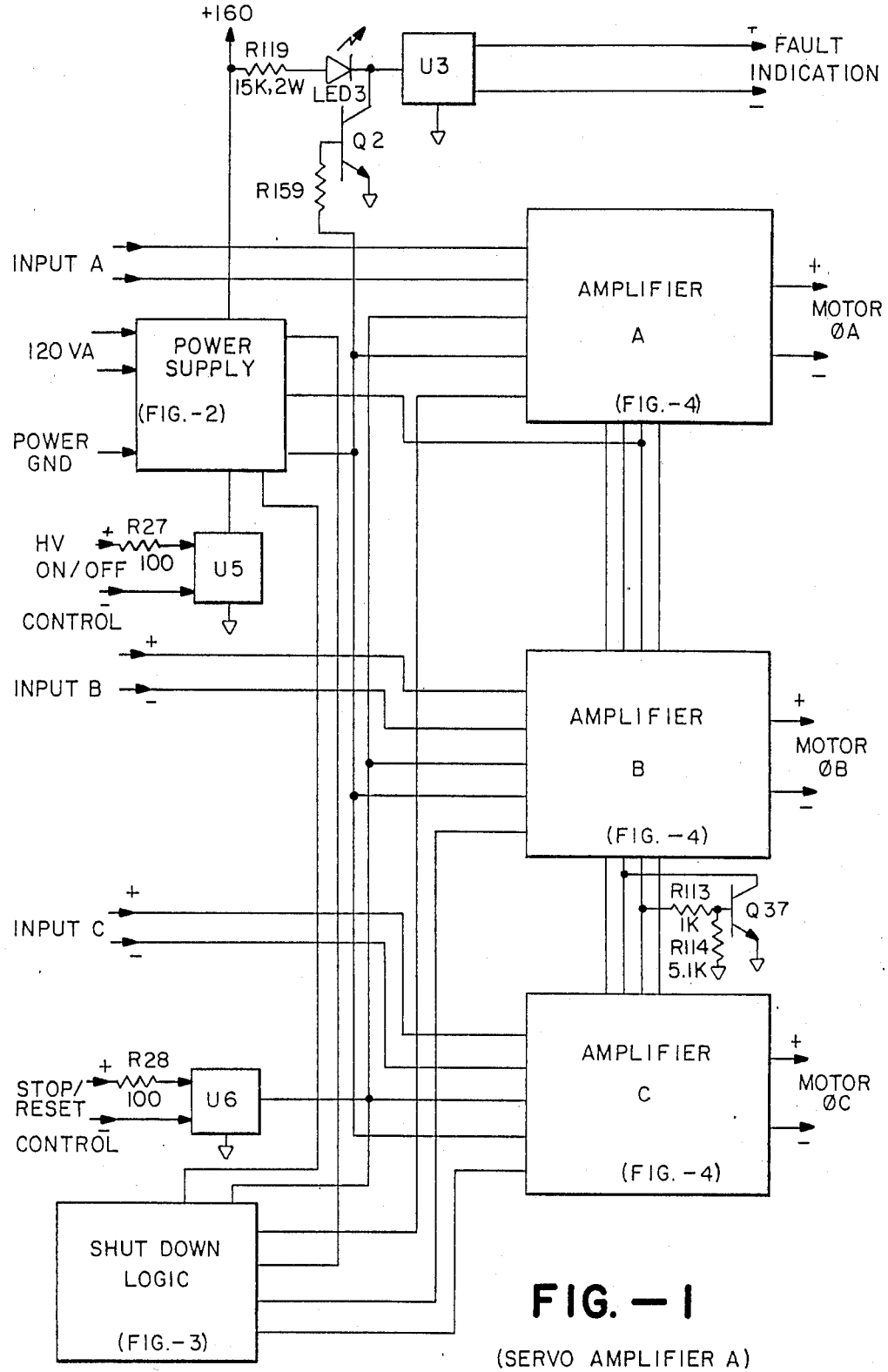
FIG. 1 is a block diagram of the major elements of the motor control system of the present invention.
Figure 4:
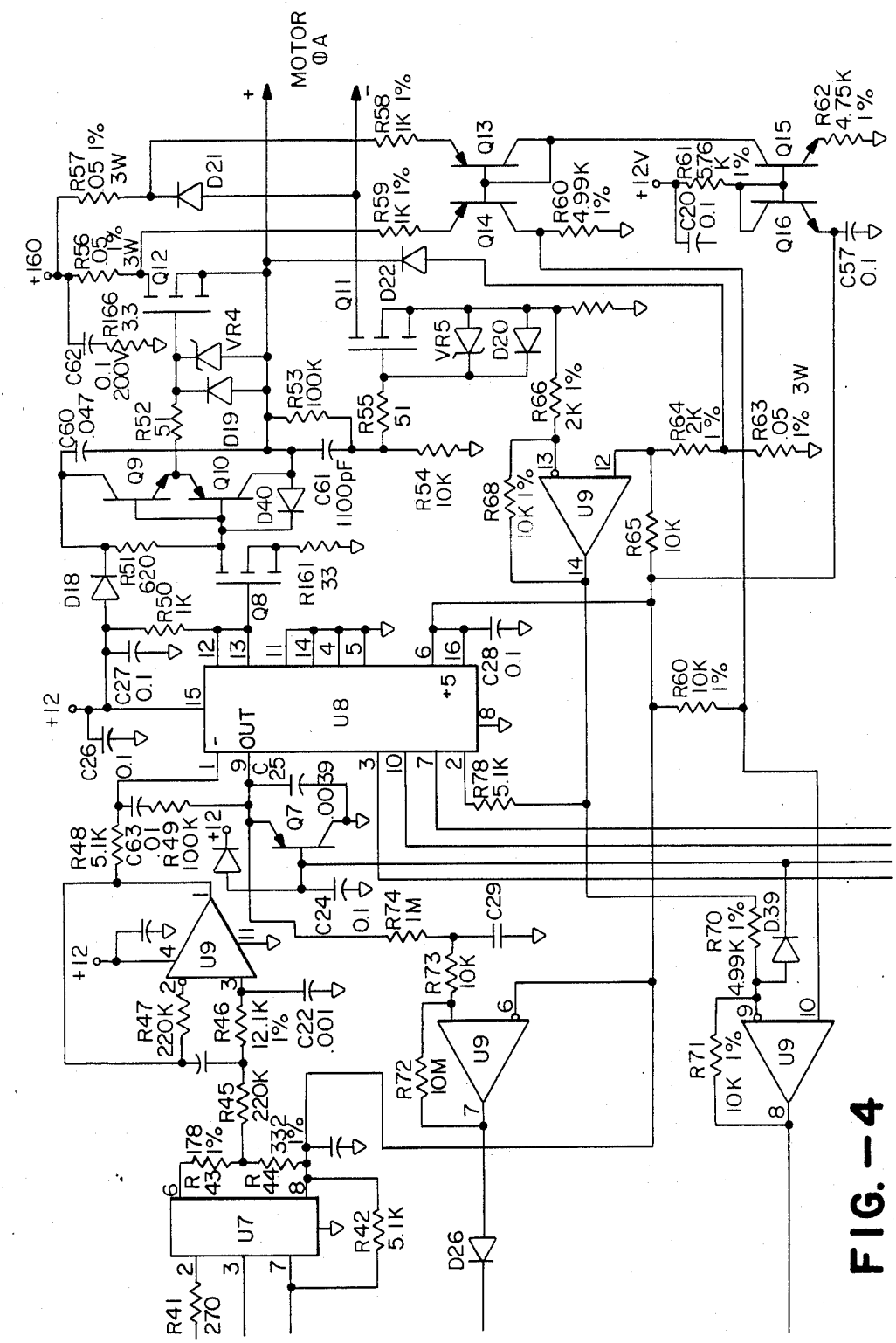
FIG. 4 is a schematic diagram of the amplifier of the present invention including representative values of many of the components.

As shown in FIG. 1, three separate amplifiers A, B and C (details of which are shown in FIG. 4) are provided for the three coils of the motor. A two-wire input is provided to each of the amplifiers. This two-wire input carries a pulse width modulated signal which defines at any instant in time the current flow to be sent to the associated coil.

Figure 5:
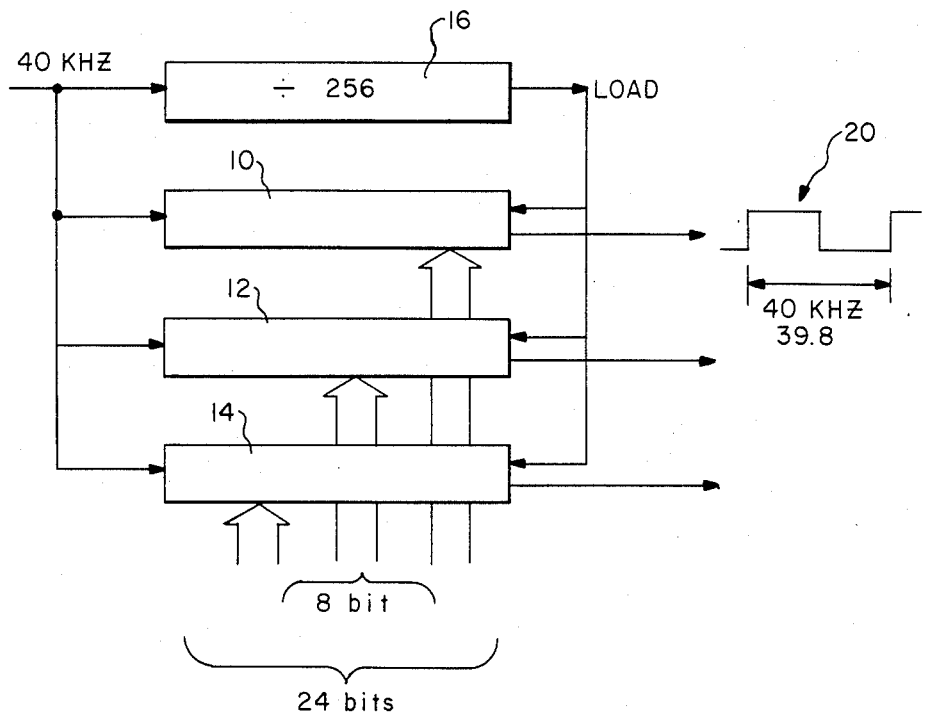
FIG. 5 is a block diagram of the data input scheme used to convert a digital output from a microprocessor controller to a pulse width modulated input to the amplifiers.

This pulse width modulated signal for each of the three amplifiers is formed using the circuitry of FIG. 5 in response to signals from a microprocessor controller (not shown). An eight-bit word is provided in parallel to each of the three counters 10, 12, 14 and is loaded therein in response to load signals from a divider 16 which receives a 10 MHz clock signal from a standard clock source. The use of this divider is to provide a load command every 256 clock cycles. Each of the three counters 10, 12, 14 is also receiving the 10 MHz signal. The signals on the output lines which form the inputs to each amplifier then comprise signals which go high on receipt of the load signal, stay high while their respective counter counts to the total number defined by the stored eight-bit word, and goes low when the full count has been achieved. If the eight-bit number is very small, then the high portion of the signal 20 is very short; if the eight-bit nubmer is large, it is very long. In this way, a 39 KHz repetition rate signal is provided to the input of each of the three amplifiers.

FIG. 4 shows details of one of the amplifiers. The input signal for each amplifier is received through an optocoupler U7. In this way, maximum use is made of digital signaling, with its accompanying noise immunity, while limiting the number of wires which must be run to each amplifier, and providing for safety by isolating the mains operated amplifiers from the control signals.

In order to minimize the space occupied by this system, no isolation transformer is provided between the amplifier and the outside power line; the AC line is connected directly to the board. Therefore, it becomes necessary to isolate the amplifier from external influences as much as possible. Optocouplers are used to couple the pulse width modulated signals to the amplifier as well as to provide a number of safety interlocks which will immediately cut off receipt of the line voltage on the board if a problem should occur.

Figure 2:
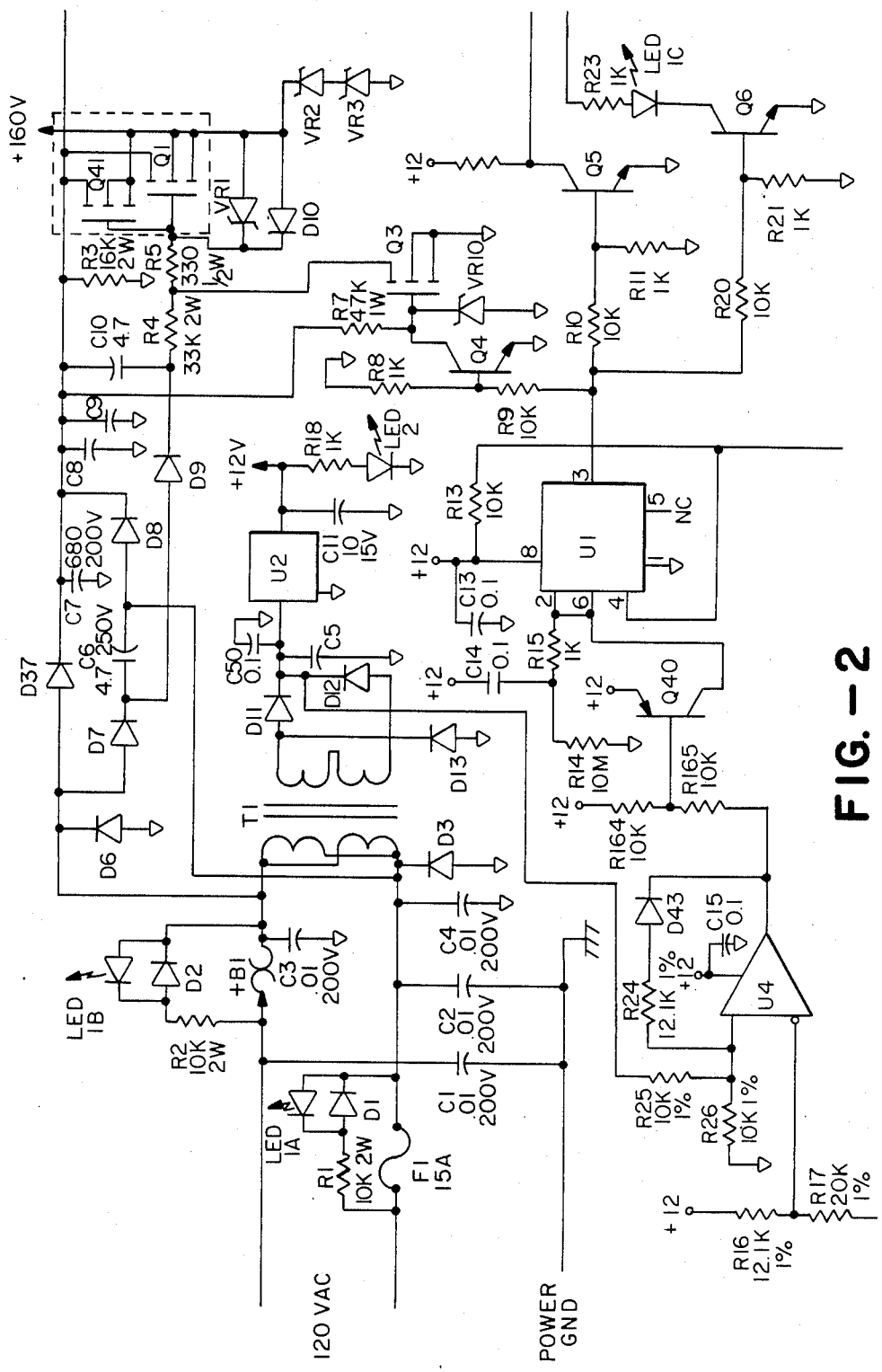
FIG. 2 is a detailed schematic diagram of the high-voltage power supply of the present invention including representative values of many of the components.

As a basic part of this safety protection, a high-voltage cutoff switch is provided. This switch includes two transistors, Q1 and Q41 (shown in the upper right of FIG. 2) which are in series between the high-voltage power supply (which includes capacitors C7, C8 and C9) and the amplifier stages; activation of this high-voltage cutoff switch in response to the detection of negative operating conditions will be discussed in the application below. However, it should be noted in discussing the various input control lines which are shown on the left-hand side of FIG. 1, that one specific control constitutes the high-voltage on/off control 24, also known as a panic button. Depression of this button sends a signal through an optocoupler U5 to the disable input pin 4 of a standard timing device U1. The output of this device, when the timing device is disabled, causes transistors Q4 and Q3 to shut down the high-voltage cutoff switches Q1 and Q41 to prevent high voltage from reaching the motor coils, thereby disabling the robot immediately on actuation of this switch. In practice, a single bit is set by the microprocessor to hold this high voltage off and the high voltage cannot be reactivated until that bit is cleared.

Figure 3:
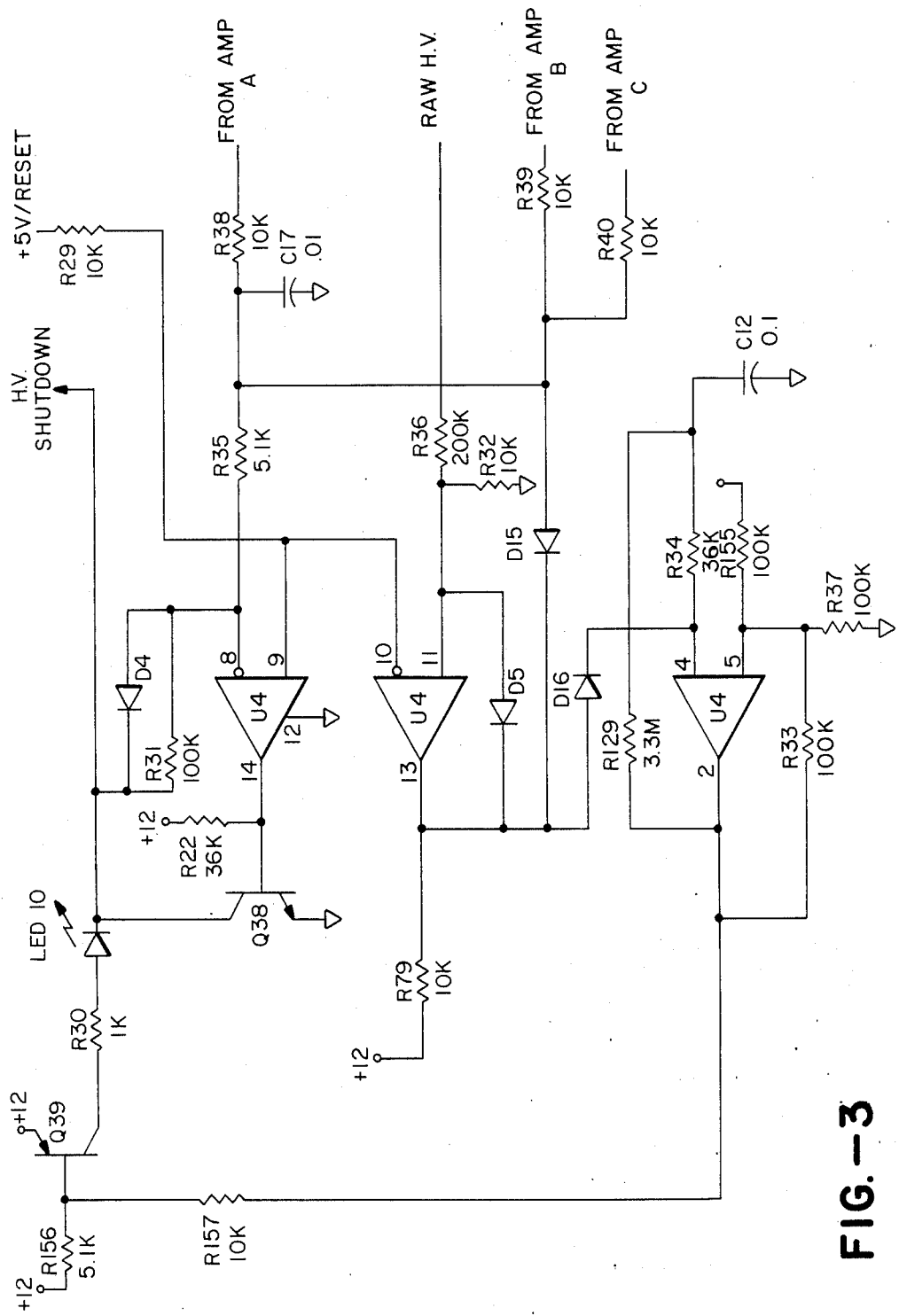
FIG. 3 is a schematic diagram of the failure mode logic circuitry of the present invention incorporating representative values of many components.

As will be discussed further in detail below, provision was made for detecting a short circuit across the output. In the event of this condition, the amplifier must be immediately shut down utilizing the shut-down logic which is shown in FIG. 3 and certain current measuring devices which are shown in FIG. 4 and will be discussed in detail below. When in order to test the amplifier or restart the amplifier, it is desired to overcome this locked-out condition, a stop reset control 24 is provided for coupling a signal through optocoupler U6 to each of the amplifiers in order that the amplifier will be turned back on. This signal is provided through the optocoupler U6 to the appropriate comparator internal to the amplifier in order to overcome the fault condition. At the same time, this signal is coupled to the shut-down logic latch 30 shown in FIG. 3 via line "x" shown in FIG. 3 to reverse the state of the latch. However, since this very necessary safety feature of a short-circuit shut-down mode is then being overridden, it is also necessary at this point to couple this signal to the inhibit input of the opto-isolation device U7 of each amplifier via line "x" shown in FIG. 4 in order to essentially provide a zero current command to the amplifier so that no current is sent to the output coils of the system. In this way, the system can be reset to begin running again without damage while the other switching and signaling logic within the system is properly set up. The signal from the optocoupler U6 resets the latch 30 through the resistor 29. It is the output of this latch 30 which is holding off the high-voltage output. This completes our description of the inputs to the system.

Turning now to the description of the amplifiers or one of the amplifiers which is shown in detail in FIG. 4, the incoming signal as previously described through resistor R41 is a 39 KHz repetition rate pulse width modulated signal which can have any one of 256 different pulse widths. At this point it should be noted that each amplifier makes use of a very accurate switching regulator U8 which incorporates a highly accurate 5-volt DC source. By using this 5-volt reference output as a reference throughout the amplifier circuit, the amplifiers can be easily duplicated and their performance can be made relatively independent of component values. The amplifiers will all have the same gain, the software will need not be tailored to meet special operating conditions, no trimming of the various components will be necessary and no potentiometer need be incorporated to adjust the gain from unit to unit after the amplifier is fully constructed. All the gain circuitry will use this 5-volt reference to determine the gain, and the feedback and signaling circuitry for carrying the controlling signal will all be referenced to this 5-volt baseline.

The 5-volt output from pin 6 of the regulator chip U8 is carried over to power supply pin 8 of optocoupler U7. This same 5-volt supply is also used as the voltage reference for the analog signal output of the optocoupler. When the optocoupler is off, the output pin 6 is pulled high to five volts. When the optocoupler is turned on, and pin 6 (due to the internal circuitry of the optocoupler U7) is pulled to ground, then the voltage divider R43, R44 provides a 2-volt signal to the resistor R45 as an input to the low-pass filter 32. Thus the output of photocoupler U7 duplicates its input, but with five volts representing zero, and two volts representing a signal high condition. The low-pass filter 32 is formed of operational amplifier U9 and its accompanying components. The intent of this low-pass filter 32 is to take the switching wave form on its input pin and convert it to a DC steady state voltage at output pin 1 for application for the positive input of the operational amplifier which is incorporated in device U8. The 39 KHz signal received from the optocoupler is filtered out, a DC voltage equal to the average of the input signal is provided at output pin 1. For example, if the input represents a signal 128 or a 50 percent duty cycle, then the output of the filter 32 is halfway between two volts and five volts, or 3.5 volts and is stable at that level. Essentially, no 39 KHz signal is passed through this filter; analog level commands are achieved at the output of this low-pass filter at a 1 KHz command rate with the 39 KHz effectively eliminated. In this way, digital to analog conversion of the command signal is provided, while complete isolation of the amplifier from the high voltage is maintained through opto-isolator U7.

The U8 device includes an operational amplifier having positive and inverting inputs 1, 2; the output of the operational amplifier is pin 9. The necessary feedback circuit is provided by the resistor R49 and capacitor C63. The input to pin 2 is a coil current feedback signal comprising a voltage proportional to the current in the coil in the motor, where five volts equals zero amps, and two volts equals maximum current, and voltages in between are linearly proportional to current flow.

The operational amplifier output on pin 9 will vary between one and four volts that is an amplified version of the difference between the command signal received on R48 and the feedback signal received on R78.

Additional circuitry provided in integrated circuit U8 converts the level of the output of the operational amplifier (pin 9) to a pulse width modulated signal which appears on output pins 12 and 13. The width of the pulses on pins 12 and 13 are directly proportional to the level of the signal on pin 9 and repeats at a frequency determined by an oscillator circuit also contained in U8. It is important to note at this point that the pulse width modulated signal which comes into the optocoupler U7 is far different from the pulse width modulated signal which is the output of the device U8. The pulse width modulated signal coming in is the command signal; the pulse width modulated output of the control circuit is an amplified version of the error signal.

Further, it should be understood that this pulse width modulated signal is a relatively low voltage signal which does not itself directly drive the motor coil. Rather, through a first switch Q8, a pair of bipolar transistors Q9, Q10, and an output transistor switch section including transistors Q11 and Q12, the high voltage 160-volt signal applied to transistors Q11 and Q12 establishes the desired drive current to the coil in accordance with the pulse width modulated error signal which is the output from device U8. Thus, for example, if the input pulse width modulated signal to optocoupler U7 is 128, this is represented by a 50 percent duty cycle signal at input pin 1 of the operational amplifier; the output pulse width modulated signal from the operational amplifier may be anywhere from zero percent to 100 percent, depending on whether the drive current to the coil applied by transistors Q11 and Q12 is to go up or down.

It should be further noted that the pulse width modulated rate for the output pulse width modulated signal from device U8 is kept just above audible (23 KHz). This is because there is actually some movement in the coils comprising the motor. Placing the frequency in the audio range would produce an annoyingly noisy motor. On the other hand, an excessively high switching speed would cause the transistors to spend too much time in their active or switching region where most of the power is consumed. The selected frequency is a compromise between these two goals.

Figure 6:
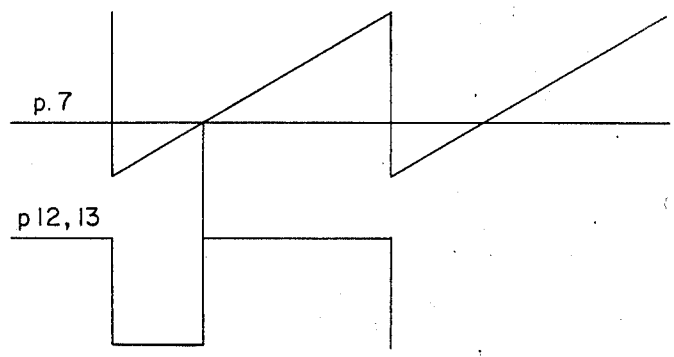
FIG. 6 is a diagram of two of the internal signals used to develop the necessary control signal to control the current through the motor coils in the amplifier of the present invention.

It should be noted that an oscillator signal must be provided to be combined with the pulse width modulated output signal of the operational amplifier and thereby generate the control signals to the coil current controlling transistors. The device U8 (which is a UC3524AN) includes an internal oscillator. Each amplifier includes one of these U8 devices with an internal oscillator. The output pins 7 on each U8 chip are tied together and one of the chips is designated the master oscillator to set the frequency for all three chips. The frequency is set by a capacitor on pin 7, and a resistor on pin 6. This is done in the master chip; the chips which now have slave oscillators have these oscillators disabled by typing pins 6 and 16 together. The generated oscillator wave form, labelled P7 in FIG. 6 is a sawtooth wave form which ramps up and then drops very quickly. Inside the device U8 under a number of comparators and the like which at any instant in time compare the value of the oscillator output voltage with the level of the signal which is the output from the operational amplifier as appears at pin 9. When the oscillator voltage is below the pin 9 voltage, then the switches controlling outputs 12, 13 are turned on; when the oscillator output is above the pin 9 voltage, then the switches controlling outputs 12, 13 are turned off. A square wave (labelled P12, 13 on FIG. 6) is thereby formed. It is used to change the state of transistor Q8 and thereby, as will be described below, control the switching rate of the output transistor switching section Q11, Q12. Thus, if the current is intended to build up or increase, then the duty cycle of each pulse width modulated signal is lengthened; if the robot is stationary, then the duty cycle will go essentially to 50 percent, which gives zero current in the motor coil.

Pins 12 and 13, the output pins from the device U8, comprise two open collector output devices which are tied together to provide a full cycle variable duty cycle square wave signal across R50. This signal is used to control the state of Q8, a full 160-volt signal. This high-voltage transistor switch applies a signal through bipolar transistors Q9 and Q10 to control the output switch transistor Q12. Q8 is turned on by application of a 12-volt signal; it is turned off if the gate voltage is zero to one volt. Transistors Q9 and Q10 swing large amounts of current into or out of the gate of Q12 in response to the state of Q8 to control the state of transistor Q12.

Transistors Q9 and Q10 are current amplifying transistors which provide the large current necessary to rapidly charge and discharge the gate capacitance of transistor Q12. It should be noted that the complete output section comprises transistor Q12 coupled in series with short-circuit sense resistor R56 between a 160-volt source and the motor coil 40, and a second transistor switch Q11 coupled to the coil and through a small current-sensing resistor R67 to ground. The drain of Q11 is connected back to the power supply through diode D21 and short-circuit sense resistor R57; the source of Q12 is connected to ground through a current sense resistor R63 and a diode D22. When the switches Q11, Q12 are closed, nearly a full 160 volts is applied across the coil, if this is applied for any appreciable period of time, current will flow in the coil as desired. When the switches Q11, Q12 are open, because of the inductance which is present in any motor coil, significant voltages would build up in the absence of the provision of diodes D21 and D22, which essentially form a regenerative circuit which sends the inductor current back into the power supply. These flyback diodes D21, D22 also protect the transistors Q11 and Q12 from excessively high voltage and effectively reverse the voltage across the coil 40 so that when the transistors are on +160 volts appears across the coil, and when off, −160 volts appears across the coil, thereby equalizing the positive and negative rate of change of current through the coil.

To control Q12, and specifically to completely turn on Q12, a gate voltage approximately 10 volts greater than the source voltage must be supplied. Since when Q12 is on, the source voltage equals the 160-volt power supply voltage, a voltage higher than 160 volts must be supplied. This is supplied by utilizing a bootstrap circuit which operates as follows:

In operation, the 12-volt source shown above device U8 charges capacitor C60 to 12 volts through diode D18 whenever the positive motor lead is clamped to ground potential by Diode D22. When device Q8 turns off, current transistor Q9 turns on and charges the gate of transistor Q12 to 12 volts, turning the transistor Q12 on very rapidly. As the source voltage rises, capacitor C60 maintains the 12-volt difference between the gate and the source of Q12. To turn off Q12, transistor Q8 is turned back on by the control signal P12, 13, turning on transistor Q10 and draining the gate of transistor Q12 through R52, Q10 and into the source of Q8. Diodes D19, VR4 are provided to protect the gate of transistor Q12 from excessive voltages.

It should be noted that when transistor Q12 is turned off, the cabling to the motor which may be 20 to 30 feet long and therefor inherently includes a considerable capacitance is initially charged to 160 volts. This capacitance is discharged by Q8. In order to limit the current flow back through transistor Q8 via diode D40, the resistor R161 is provided.

As a safety feature, transistor Q11, which must be turned on at the same time as Q12, is driven directly off the output voltage to the motor coil rather than off transistor Q8. Therefore, if transistor Q12 fails and ceases to function, transistor Q11 will be turned off to prevent more damage. Further, transistor Q11 is to be driven as fast as possible; by this connection which includes the voltage divider R53, R54, and speed-up capacitor C61, the 160-volt square wave on the source of Q12 drives the transistor Q11. The voltage across divider R53, R54 drives the transistor in steady state; capacitor C61 quickly drives the gate to turn the transistor Q11 on during switching. Therefore, the transient turns Q11 on as fast as Q12 goes on, and if transistor Q12 does not go on, neither does transistor Q11.

As described above when discussing the operational amplifier included in device U8, to stabilize the current through the motor coil at the commanded level, a voltage proportional to the current through the coil must be provided at the non-inverting input 2 of the operational amplifier. This is provided by op amp U9 which has connected to its inverting input 13 a resistor which receives as its input a voltage across current sense resistor R67 proportional to the current through the coil when Q11 and Q12 are on, and at its non-inverting input 12 the voltage across R63 when diodes D21 and D22 are conducting which is equal and opposite to the voltage across R67. The sum of the two is a steady-state DC signal which can be scaled to vary between two and five volts by using R65 which is connected to the 5-volt reference to provide a portion of the reference voltage and R68 which helps set the gain of U9. The output of this op amp U9 at pin 14 provides the feedback to the operational amplifier of device U8. It also comprises an input to pin 9 of comparator connected U9 (U9 is a quad or 4-section op amp) whose other input is connected to a system for detecting any short-circuit across the output, either to ground or across a coil. A change in the output of comparator U9 at pin 8 will set the latch 30 of the shutdown logic shown in FIG. 3; this in turn will cause timer U1 to open the solid state switches Q1, Q41 to cut off the high voltage. This is necessary because either type of short will result in large current flow which is potentially damaging to the entire amplifier.

In order to detect this short-circuit condition, two resistors R56 and R57 are provided at the top of the amplifier circuit, one connected to one side of the switching transistor Q12 and to the high voltage supply, the other connected to the diode D21 of the regenerative circuit and the high voltage supply. These two resistors are connected through resistors R58, R59 to a differential amplifier formed of transistors Q13, Q14. Transistor Q13 is coupled to a current mirror formed of transistors Q15 and Q16. A voltage source is provided for the base of transistor Q15 so that the voltage across and the current through R62 are constant, and transistor Q15 functions as a current reference. The voltage at the base of transistor Q14 is proportional to the voltage across R58 plus the current through R57. Due to the effect of the differential amplifier, transistor Q14 provides a current into R60 proportional to the voltage across R57 minus the voltage across R56. A current referenced to the 5-volt reference flows through R69 and into R60 forming a referenced voltage for pin 10 of comparator U9 which is normally biased by the feedback comparator voltage and the feedback output proportional to the coil current. Thus, comparator U9 has a scaled offset so that if the system is operating properly, it has a 5-volt output signal on pin 8 indicating that the current out of the supply is equal to the current to ground, a normal operating condition. If a short occurs, the output of comparator U9 drops, tripping the latch 30. This occurs because the dynamic range of the current mirror which serves as the current reference to the differential amplifier is less than the dynamic range of the output pin 14 of amplifier U9, so the current inputs into pins 9 and 10 no longer match. The input into resistor R38 changes, tripping the latch 30 by modifying the input to pin 8 shown in FIG. 3.

An open circuit condition is handled differently because of the fact that inherently no damaging current can flow and therefore, damage to the amplifier is less likely to occur. However, this fault must still be indicated. The way this is done is to monitor the output from the operational amplifier at pin 9 of device U8 using comparator U9 pins 5, 6, 7. Because some small current will always flow into pin 1 from the low pass filter 32, there will always be some slight difference between the input to pin 1 and the zero current flowing through the coils. Therefore, when an open circuit occurs, the output of pin 9 must over time go all the way to the maximum and stay there. By providing a capacitor C29 and resistor R74 at the input pin 5 to comparator U9, transients can be filtered out and only continuous duration maximum outputs can be detected. Input pin 6 receives the 5-volt reference taken from device U8. If the input to pin 5 stays high long enough, then the output at pin 7 changes in state and an output from diode D26 is coupled to optocoupler U3 to provide a fault indication. This is a bypass from the usual fault indication which comes from a point shown in FIG. 2 in the power supply section as normally the fault indication occurs for a cutoff of high voltage. In this case the fault indicator is directly driven. Further, LED 1C (FIG. 2) is turned on to signal that an open circuit condition exists on the amplifier board.

Other negative conditions which are indicated by the lighting of LEDs include opening of a fuse F1 which is indicated by LED1A and opening of a thermal breaker which monitors for an overheated amplifier which is indicated by LED1B. The fuse F1 and thermal breaker TB1 are in series with the AC supply and thus shut the amplifier off whenever they open.

It should also be noted that the general indication of a fault on a given board is provided through optocoupler U3 whose output is continually monitored by the microprocessor and whose input is through LED3 from one side of the two voltage control input switches Q1, Q41. an indicator is also provided driven by 12-volt regulator U2; lighting of LED2 or LED3 indicates that the necessary voltage supply is on.

The low-voltage DC supply is monitored by coupling the output side of the transformer T1 through a voltage divider network comprising R25, R26 to an input of a comparator U4 which receives a standard input bias voltage to its other terminal. If the voltage on the output side of the transformer T1 drops low, then the output of this comparator U4 sends a signal through the standard 555 timer U1 through transistor Q40 to switch transistor Q3 to turn off the high voltage cutoff switch comprising transistors Q1, Q41.

The input of U4 through R17 is also connected to the high voltage on/off control (FIG. 1) so that the output of U4 can enable or disable timer U1 based on the state of this control switch. The control timer U1 is necessary any time operation of the amplifier in response to commands from the microprocessor is being initiated. The timer incorporates a preset delay into application of high voltage to the amplifier through switches Q1, Q41. This allows for the fact that because of the speed of operation of the microprocessor, it may be possible to transmit commands to the amplifier before the necessary 12-volt bias voltages are established, leaving some of the logic on the amplifier board in an indeterminate state. The timer U1 provides a 1-second delay between the time power appears at transformer T1 or the high voltage switch is turned on before the amplifier can actually begin to operate to drive the coils.

It is also essential to protect against excessive droop of the high voltage (160 v) DC supply which drives the coils through transistors Q11 and Q12. It is necessary to monitor this condition separately because since Q11 is driven from Q12 through C61 and its surrounding resistors, if the DC supply droops below approximately 105 volts, Q11 cannot turn on and the robot will not move well. There are two levels of protection against the high voltage droop. On a gross level, the 160-volt supply is provided through R7 to drive Q3 and thus the high voltage cutoff switches, Q1, Q41; therefore, if it really droops excessively, these switches will not turn on. In addition, the high voltage is connected through a voltage divider R36,R32 shown in the failure detection logic of FIG. 3 to one side of the latch 30 so that the latch holds the timer U1 off. Pin 4 of the 555 timer is an enable pin; a low output of the protection circuitry holds this pin disabled in the event of a negative condition such as this high voltage drop. An output 3 of timer U1 is also connected back through transistor Q5 to the shutdown pin 10 of each device U8 on the amplifier boards to shut down operation of the pulse width modulator section of each amplifier and eliminate the possibility of any command response. The low DC voltage supply (12 volts) is used to bias the 555 timer U1; therefore, if this supply droops excessively, U1 has no output and again, the operation of the system is shut down and high voltage is disabled by Q1 and Q41.

Just to consider the essential concepts of the failure shutdown circuitry of FIG. 3, the short-circuit signals come from pin 8 of U9, which goes low in the event of failure. High frequency transients are filtered out by the resistors R38, R39 and R40 which are connected to the outputs of pin 8 of comparator U9 on each amplifier. The summed output is fed to capacitor C17 to eliminate the high frequency transients and then goes to pin 8 of latch 30. When pin 8 of U4 goes low, its output pin P14 goes high, turning on transistor Q38 and lighting LED 1D to indicate a failure. The same line continues up to the disable pin of the 555 timer to disable this timer and hold the high voltage cutoff transistors Q1, Q41 off. Diode D4 and resistor R31 are provided to provide a hysteresis effect to latch the high voltage off. The comparator operates against the sum of the three 5-volt references provided from the three devices U8 which have provided the reference voltages for each of the amplifiers. The only way the latch can be reset is to pull this summation voltage below its normal level; therefore, it is very difficult to reset the latch without responding to the negative condition. Resetting is accomplished through micro- processor command via optocoupler U6 as described above.

The 160-volt supply can also be monitored by dividing it down using resistors R36 and R32 and bringing it into a pin of comparator U4. When pin 11 goes low, then the pin 13 goes low, the condition is latched via diode D15 and the condition is indicated through LED 1D. However, to distinguish this condition from the other conditions indicated by LED 1D, a stage comprising input pins 4 and 5 and output pin 2 is provided; the output oscillates at a 1 Hertz rate so that the LED 1D blinks to indicate the high voltage droop condition. In other words if LED1D is steady, a short-circuit condition is indicated; if LED1D is blinking, it is a high-voltage droop.

Although no mention may have been made in certain components in the system disclosed above, these are all standard components whose placement and utilization would be readily apparent to a person of ordinary skill in the art. Other modifications or implementations of the concepts disclosed in the present application may be apparent to a person of skill in the art who studies the subject invention disclosure. Therefore, the scope of the present invention is to be limited only by the following claims.

What is claimed is:

1. A control system for driving three electrically isolated coils of a high current, three-phase, variable reluctance motor comprising a source of high voltage for driving said coils, separate amplifier means connected to each of said electrically isolated coils for providing a pulse width modulated signal to switch said high voltage source applied to each said coil of said three-phase motor in response to a microprocessor supplied digital input command signal, each of said separate amplifier means including:
   a constant voltage level reference source for gain circuitry in said amplifier,
   input means for converting a digital input command to a pulse width modulated input control signal,
   means for converting said pulse width modulated input signal to a steady state command voltage signal to represent the desired motor torque and coil current for said connected coil,
   feedback means coupled to one of said coils for developing a feedback signal representing current in said coil,
   means coupled to said converting means and said feedback means for comparing the desired current level in the coils with the actual current in the coils,
   means responsive to said comparison for defining an error signal to each coil to equalize said command signal and said feedback signal, and
   means for monitoring negative operating conditions in said amplifier and cutting off said high voltage in response to detection of negative operating conditions in said amplifier or said motor coil.

2. A control system as claimed in claim 1 wherein the input means coupled to the input of each of said amplifiers for supplying thereto said pulse width modulated input signal comprise a plurality of shift registers for storing a parallel input signal, and clock means coupled to said shift registers for reading out the signal stored in each register as said pulse width modulated signal to each of the amplifiers.

3. A control system as claimed in claim 1 wherein said control system is connected directly to an external power line without an isolation transformer, and including opto-isolation means for coupling the pulse width modulated input signals from said shift registers to the control amplifiers of each of said coils.

4. A control system as claimed in claim 1 including switch means between the high voltage power supply and the amplifier and responsive to said monitoring means for cutting off high voltage to the amplifier.

5. A control system as claimed in claim 1 wherein said condition monitoring means includes means for detecting a short circuit at the output of any of said amplifiers to one of said coils, and means responsive to said detecting means for defeating input commands from the microprocessor to the amplifier.

6. A system as claimed in claim 5 including optocoupler means for coupling said pulse width modulated input control signals to each of said amplifiers and means coupling the reset section of the condition detecting device to said opto-isolation means for defeating transmission of motor commands to the amplifier.

7. A system as claimed in claim 5 wherein the output of said opto-isolation means is compared to said constant reference level voltage.

8. A system as claimed in claim 7 including a low pass filter means coupled between said input means and said comparing means for converting the pulse width modulated control signal to said analog command voltage signal for controlling the current in the coil coupled to the amplifier.

9. A system as claimed in claim 8 wherein said comparing means comprises first and second inputs, the output of said low pass filter being coupled to said first input, a voltage signal proportional to the current in the motor coil comprising a feedback signal coupled to said second input, said output error signal of said comparison means comprising a pulse width modulated signal proportional to the difference between said two input signals to control current in said coil coupled to said amplifier.

10. A system as claimed in claim 1 wherein said output signal defines a switching frequency of about 23 Khz to compromise noise and the time of active operation of said coil drive transistors.

11. A system as claimed in claim 1 wherein said coil drive means responsive to said error signal comprise an MOS switch being coupled the output of said pulse width modulated error signal source, and
   a pair of current amplifying bipolar transistors coupled to the output of said first MOS switch and coupled to the control gate of one of said coil drive transistors to provide a large current signal to the control gate of said transistor.

12. A system as claimed in claim 9 including coil drive means comprising a pair of MOS transistors, one on either side of said coil connecting said coil between said high voltage supply and ground, said error signal being coupled to the gates of said transistors to control the rate of current flow through said coil, thereby stepping said motor.

13. A system as claimed in claim 12 further comprising a diode coupled between each side of said coil and said high voltage power supply, said diode being polarized to return supply voltage to said supply when said transistors are turned off, said diodes thereby conducting current alternatively with said MOS transistors to form a regenerative circuit.

14. A system as claimed in claim 12 wherein said voltage reference level comprises a relatively low voltage source for biasing the active devices in said amplifier, said coil drive means comprising a capacitor coupled to said low voltage source adopted to function as a voltage store and coupled to the collectors of said bipolar transistors, said bipolar transistors responding to said first MOS switch to transfer the charge on said capacitor to the gate of said coil drive transistors.

15. A system as claimed in claim 14 further comprising a current limiting resistor coupled between the emitters of the transistors and the gate of one of said switching transistors of said second switch.

16. A system as claimed in claim 15 further comprising a voltage divider coupled between the source of said one transistor of the coil drive transistors and the gate of the other of said coil drive transistors for driving said other transistor.

17. A system as claimed in claim 16 wherein said feedback means comprises first and second resistors connected in series with said coil drive transistor pair and to the inputs of a differential amplifier, the output of said differential amplifier comprising the feedback signal.

18. A system as claimed in claim 1 wherein said monitoring cut-off means comprise condition responsive logic circuitry means coupled to each of said three amplifiers and responsive to operating conditions in said amplifiers, and a high voltage transistorized switch connected between the high voltage source and said coil and adapted to fail open responsive to said condition responsive logic circuitry.

19. A system as claimed in claim 18 including a pair of drive transistors coupled in series with said coil, said operating condition monitoring means comprising means for detecting a short-circuit condition comprising a pair of current monitoring resistors coupled between said drive transistors and said high voltage source, a differential amplifier connected to said current monitoring transistors for monitoring the difference in current flow through said transistors, means for comparing the output of said transistors, means for comparing the output of said differential amplifier with a reference signal comprising said feedback signal, said high voltage transistorized switch being responsive to the output of said comparator.

20. A system as claimed in claim 9 further comprising open circuit detecting means comprising timing means coupled to an output of said means for defining an error signal including filter means for determining the existence of a maximum output signal beyond a predetermined limit, and means for signalling an open circuit condition in response to said predetermined limit being excluded.

21. A system as claimed in claim 1 wherein said monitoring means comprise means for detecting low voltage comprising means for comparing the voltage to a defined low voltage reference level, a transistorized switch pair coupled to said high voltage source, and means responsive to said comparator and coupled to said switch pair for cutting off said high voltage in response to the low voltage condition.

22. A system as claimed in claim 21 wherein said means coupled to the switch transistor pair comprise a timer circuit with a first input for enabling said high voltage source switches and a disable input coupled to said monitoring means and responsive thereto for disabling said high voltage switches.

23. A system as claimed in claim 22 wherein said monitoring means comprise a flip-flop having an input connected to means for detecting negative conditions in the amplifier and an output connected to the disabling input of the timer.

* * * * *